(12) United States Patent
Chou et al.

(10) Patent No.: US 11,953,344 B2
(45) Date of Patent: Apr. 9, 2024

(54) DUST-PROOF SENSING DEVICE

(71) Applicant: Foxlink Image Technology Co., Ltd., New Taipei (TW)

(72) Inventors: You Chung Chou, New Taipei (TW); Kuan Cheng Huang, New Taipei (TW)

(73) Assignee: Foxlink Image Technology Co., Ltd., New Taipei (TW)

( * ) Notice: Subject to any disclaimer, the term of this patent is extended or adjusted under 35 U.S.C. 154(b) by 248 days.

(21) Appl. No.: 17/717,353

(22) Filed: Apr. 11, 2022

(65) Prior Publication Data
US 2023/0009174 A1    Jan. 12, 2023

(30) Foreign Application Priority Data
Jul. 7, 2021    (CN) .......................... 202121539495.7

(51) Int. Cl.
*G01D 11/24*    (2006.01)
*G01D 11/16*    (2006.01)
*G01V 8/20*    (2006.01)

(52) U.S. Cl.
CPC ........... *G01D 11/245* (2013.01); *G01D 11/16* (2013.01); *G01V 8/20* (2013.01)

(58) Field of Classification Search
CPC ........ G01D 11/245; G01D 11/16; G01V 8/20; B41J 11/0095
USPC ......................................................... 356/431
See application file for complete search history.

(56) References Cited

U.S. PATENT DOCUMENTS

| | | | |
|---|---|---|---|
| 2007/0009275 A1* | 1/2007 | Yokoyama | B41J 11/0095 399/69 |
| 2010/0066782 A1* | 3/2010 | Yamamoto | B41J 29/13 271/265.01 |
| 2012/0257222 A1* | 10/2012 | Jiang | B41J 29/13 358/1.5 |

* cited by examiner

*Primary Examiner* — Md M Rahman
(74) *Attorney, Agent, or Firm* — Lin & Associates Intellectual Property, Inc.

(57) ABSTRACT

A dust-proof sensing device includes a mechanical body, a feeding path, a first photoelectric sensor disposed above the feeding path, a second photoelectric sensor disposed under the feeding path, and an upper bracket. The mechanical body has a feeding path. The upper bracket is mounted above the feeding path. The upper bracket has an upper fastening portion fastened to the mechanical body, an upper wedging portion fastened at the upper fastening portion, an L-shaped upper light guiding holder fastened at the upper fastening portion, and a first light guider fastened at the upper light guiding holder. The upper fastening portion has a first inclined section. An inner edge of an upper surface of the first inclined section is intersected with a top edge of an inner surface of the upper wedging portion to form a clamping angle.

11 Claims, 8 Drawing Sheets

DUST-PROOF SENSING DEVICE

CROSS-REFERENCE TO RELATED APPLICATION

The present application is based on, and claims priority from, China Patent Application No. 202121539495.7, filed Jul. 7, 2021, the disclosure of which is hereby incorporated by reference herein in its entirety.

BACKGROUND OF THE INVENTION

1. Field of the Invention

The present invention generally relates to a sensor used in a printer or a scanner, and more particularly to a dust-proof sensing device used in a printer or a scanner, and the dust-proof sensing device is able to effectively ensure a sensing sensitivity for improving a paper feeding reliability of the printer or the scanner.

2. The Related Art

As is known to all, a printing equipment which is a printer generally has a sensing device. A scanning equipment which is a scanner generally has the sensing device. The sensing device is disposed at an entrance of a paper feeding path, the sensing device acquires position signals of consumable items for detecting whether the consumable items are in place, and then the consumable items are ensured to be fed into a subsequent position of the paper feeding path continuously.

Figure 7:
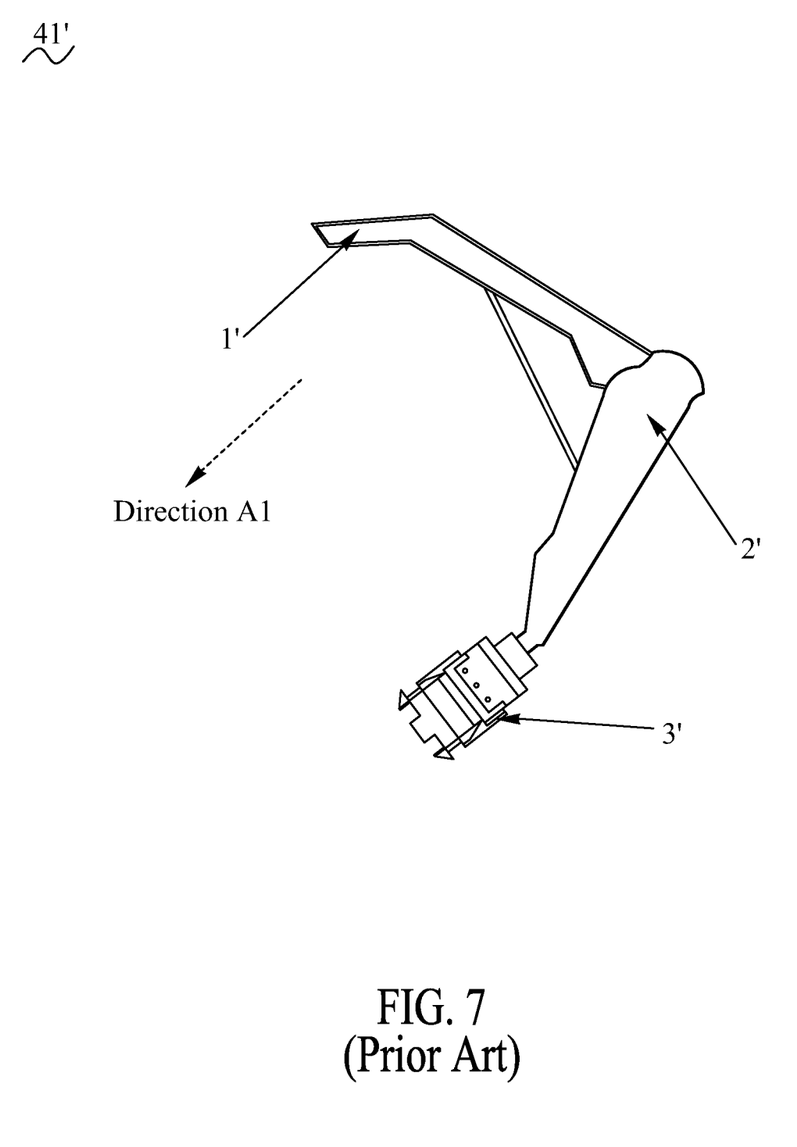
FIG. 7 is a schematic diagram that shows a structure of a conventional sensing device in prior art.

Referring to FIG. 7, a conventional sensing device 41' includes a swinging arm 1', a rotation axis 2' and a penetrating sensor 3'. The swinging arm 1' is integrated with the rotation axis 2', and one end of the rotation axis 2' is connected with the penetrating sensor 3' to form the conventional sensing device 41'. The conventional sensing device 41' feeds the consumable items along a feeding direction (A1). The penetrating sensor 3' is arranged at one side of the paper feeding path, and the swinging arm 1' proceeds with a position signal transmission of each consumable item to detect the consumable item by the penetrating sensor 3', so that paper scraps and carbon powders will seldom be stacked on the penetrating sensor 3' to affect the position signal transmission of the penetrating sensor 3'. Nevertheless, the conventional sensing device 41' requires a larger space, an assembly of the conventional sensing device 41' costs a lot of time, the conventional sensing device 41' has a large quantity of components, the conventional sensing device 41' has a higher cost, the conventional sensing device 41' has long signal response time, and the conventional sensing device 41' is apt to cause a higher failure probability due to a signal bounce.

Figure 8:
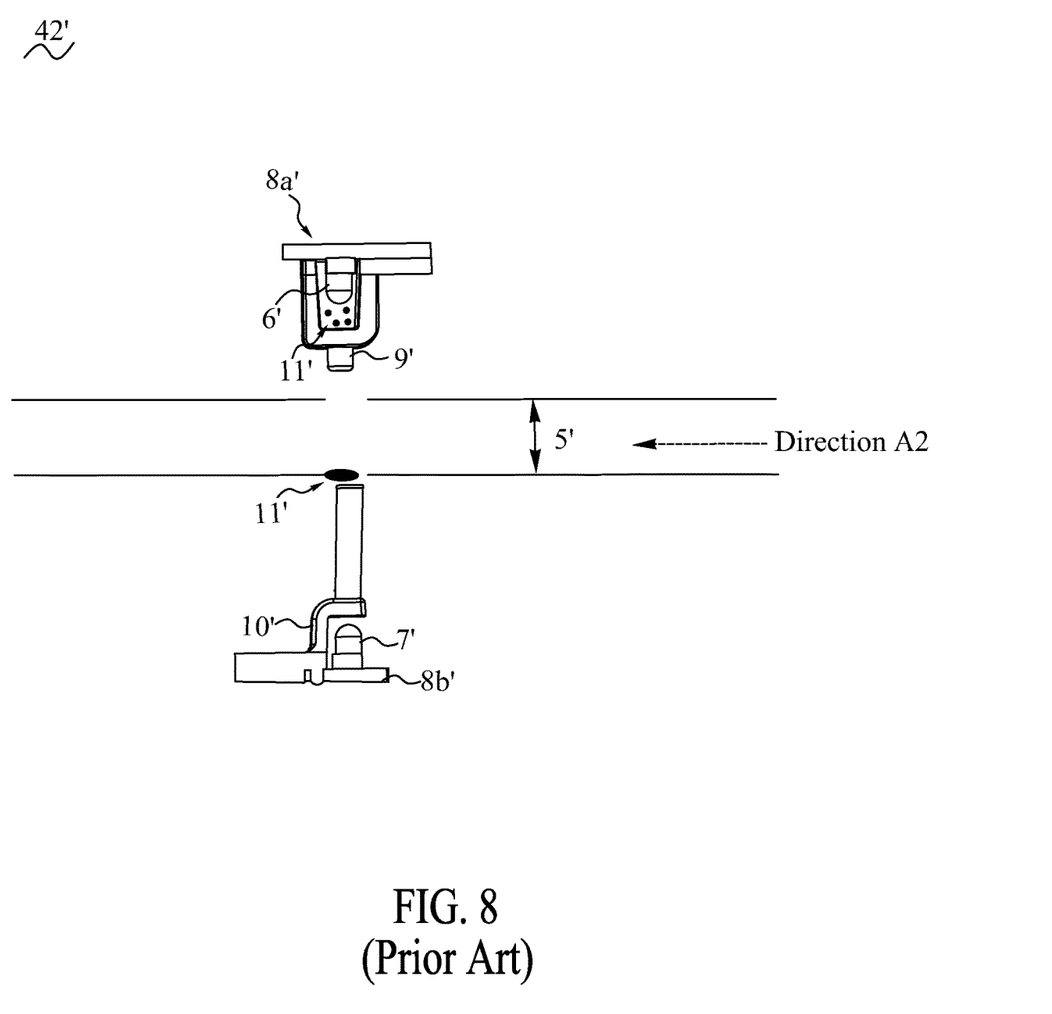
FIG. 8 is a schematic diagram that shows the structure of a traditional sensing device in the prior art.

Referring to FIG. 7 and FIG. 8, in order to overcome existed problems of the conventional sensing device 41', a traditional sensing device 42' shown in FIG. 2 is an optical sensor. The traditional sensing device 42' includes a transmission channel 5', an emitter photo-electricity crystal sensor 6', a collector photo-electricity crystal sensor 7', an emitter light guider 9' and a collector light guider 10'. The emitter photo-electricity crystal sensor 6' is arranged at an upper side of the transmission channel 5', and the collector photo-electricity crystal sensor 7' is arranged at a lower side of the transmission channel 5'. The emitter photo-electricity crystal sensor 6' and the collector photo-electricity crystal sensor 7' are oppositely disposed. The emitter photo-electricity crystal sensor 6' is soldered to a first printed circuit board 8a', and the emitter photo-electricity crystal sensor 6' is locked to the emitter light guider 9'. The collector photo-electricity crystal sensor 7' is soldered on a second printed circuit board 8b', and the collector photo-electricity crystal sensor 7' is fastened to the collector light guider 10' to detect the position signals of the consumable items. The traditional sensing device 42' which is the optical sensor requires a smaller space, an assembly of the traditional sensing device 42' is simple, the traditional sensing device 42' responds sensitively and quickly, and the traditional sensing device 42' is without the higher failure probability due to the signal bounce.

However, when the traditional sensing device 42' is used, and the consumable items are continuously fed along a feeding direction (A2), the paper scraps, carbon dust 11' and other impurities will be gradually accumulated in the transmission channel 5', consequently, the collector photo-electricity crystal sensor 7' is apt to be covered or signals of the collector photo-electricity crystal sensor 7' are shielded, and the traditional sensing device 42' is apt to result in a failure of detecting the consumable items.

Therefore, it is especially important to provide a dust-proof sensing device used in a printer or scanner, and the dust-proof sensing device is able to effectively ensure a sensing sensitivity for improving a paper feeding reliability of the printer or the scanner.

SUMMARY OF THE INVENTION

An object of the present invention is to provide a dust-proof sensing device used in a printer or a scanner, and the dust-proof sensing device is able to effectively ensure a sensing sensitivity for improving a paper feeding reliability of the printer or the scanner. The dust-proof sensing device is adapted for being used in a printer or a scanner. The dust-proof sensing device includes a mechanical body, a feeding path, a first photoelectric sensor disposed above a top side of the feeding path, a second photoelectric sensor disposed under a bottom side of the feeding path, and an upper bracket. A middle of the mechanical body has a feeding path. The upper bracket is mounted above the top side of the feeding path. The upper bracket has an upper fastening portion fastened to the mechanical body, an upper wedging portion fastened at a lower portion of the upper fastening portion, an L-shaped upper light guiding holder fastened at one side of a lower surface of the upper fastening portion, and a first light guider fastened at an outer surface of a short section of the L-shaped upper light guiding holder. The upper fastening portion has a first mounting section, and a first inclined section connected to an outer side of the first mounting section. The first mounting section is disposed horizontally. A top surface and a bottom surface of the first mounting section of the upper fastening section are parallel to a horizontal plane. An inner edge of an upper surface of the first inclined section of the upper fastening portion is intersected with a top edge of an inner surface of the upper wedging portion to form a clamping angle. The horizontal plane, and a center line of the first photoelectric sensor and the second photoelectric sensor also form the clamping angle, the first photoelectric sensor is fastened below the upper wedging portion, the first photoelectric sensor and the horizontal plane also form the clamping angle.

Another object of the present invention is to provide a dust-proof sensing device adapted for being used in a printer or a scanner. The dust-proof sensing device includes a mechanical body, a feeding path, a first photoelectric sensor disposed above a top side of the feeding path, a second photoelectric sensor disposed under a bottom side of the feeding path, an upper bracket and a lower bracket. A middle of the mechanical body has a feeding path. The upper bracket is mounted above the top side of the feeding path. The upper bracket has an upper fastening portion fastened to the mechanical body, an upper wedging portion fastened at a lower portion of the upper fastening portion, an L-shaped upper light guiding holder fastened at one side of a lower surface of the upper fastening portion, and a first light guider fastened at an outer surface of a short section of the L-shaped upper light guiding holder. The first photoelectric sensor is corresponding to the first light guider. The upper fastening portion has a first mounting section, and a first inclined section connected to an outer side of the first mounting section. The first mounting section is disposed horizontally. A top surface and a bottom surface of the first mounting section of the upper fastening section are parallel to a horizontal plane. An inner edge of an upper surface of the first inclined section of the upper fastening portion is intersected with a top edge of an inner surface of the upper wedging portion to form a clamping angle. The lower bracket is mounted under the bottom side of the feeding path. The upper bracket and the lower bracket are isolated by the feeding path. The lower bracket has a lower fastening portion fixed to the mechanical body, and a lower wedging portion protruded upward from one side of an upper surface of the lower fastening portion. An inner side of a front end of the lower fastening portion slantwise extends frontward and upward to form a hooded lower light guiding holder. The hooded lower light guiding holder extends beyond a front end of the lower wedging portion. A top of the hooded lower light guiding holder is equipped with a second light guider. The second photoelectric sensor is assembled in the hooded lower light guiding holder. The second photoelectric sensor is corresponding to the second light guider. The horizontal plane, and a center line of the first photoelectric sensor and the second photoelectric sensor also form the clamping angle, the first photoelectric sensor is fastened below the upper wedging portion, the first photoelectric sensor and the horizontal plane also form the clamping angle, the second photoelectric sensor is in alignment with the first photoelectric sensor through the first light guider and the second light guider.

Another object of the present invention is to provide a dust-proof sensing device of a scanner or a printer. The dust-proof sensing device includes a mechanical body, a feeding path, a photoelectric sensor and a bracket. The feeding path is formed in the mechanical body. The photoelectric sensor is disposed above a top side of the feeding path or disposed under a bottom side of the feeding path. The bracket is mounted above the top side of the feeding path or mounted below the bottom side of the feeding path. The bracket has a fastening portion, a wedging portion, a light guiding holder and a light guider. The fastening portion is fastened to the mechanical body. The fastening portion has a mounting section, and an inclined section connected to an outer side or an inner side of the mounting section. The mounting section is disposed horizontally. A top surface and a bottom surface of the mounting section are parallel to a horizontal plane. The photoelectric sensor is connected to the inclined section. The wedging portion is connected between the mounting section and the inclined section. The wedging portion is fastened at a lower portion or an upper portion of the fastening portion. An inner edge of an upper surface of the inclined section of the fastening portion is intersected with a top edge of an inner surface of the wedging portion to form a clamping angle, or a rear of a lower edge of an inner surface of the wedging portion is intersected with the bottom surface of the mounting section of the fastening portion to form the clamping angle. The light guiding holder is mounted at the inclined section, and the light guiding holder is positioned below or above the photoelectric sensor. The light guider is positioned at a bottom or a top of the light guiding holder. The photoelectric sensor is corresponding to the light guider. The horizontal plane and a center line of the photoelectric sensor form the clamping angle.

As described above, the inner edge of the upper surface of the first inclined section of the upper fastening portion is intersected with the top edge of the inner surface of the upper wedging portion to form the clamping angle, and a lower edge of an inner surface of the lower wedging portion away from the hooded lower light guiding holder is intersected with a bottom surface of a second mounting section of the lower fastening portion to form the clamping angle, so paper scraps and carbon dust will be deposited behind the second photoelectric sensor, and photoelectric sensing signals of the second photoelectric sensor will be without being shielded.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
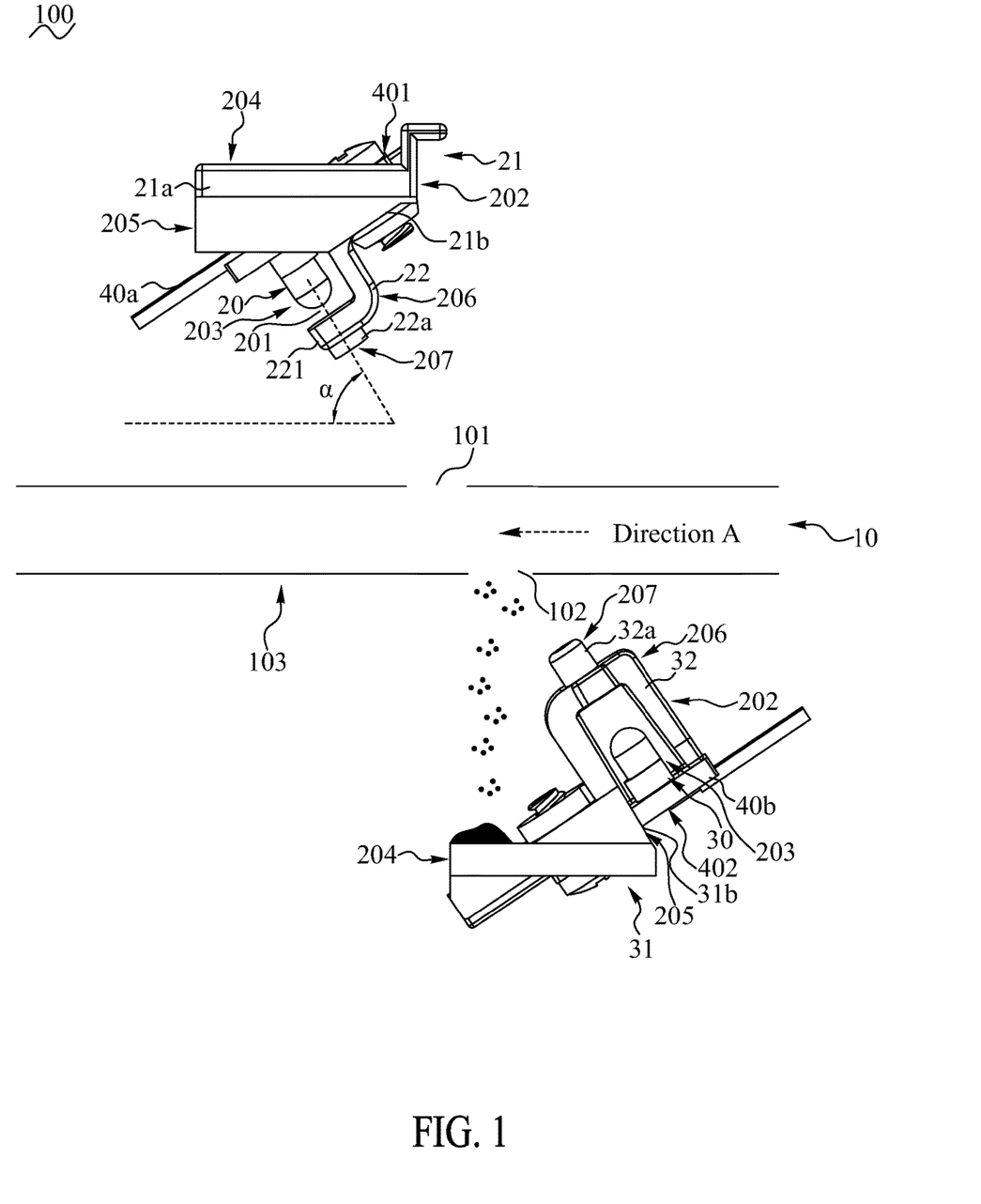
FIG. 1 is a front view of a dust-proof sensing device in accordance with a preferred embodiment of the present invention, wherein the dust-proof sensing device is used in a printer or a scanner.

Referring to FIG. 1, a dust-proof sensing device 100 in accordance with a preferred embodiment of the present invention is shown. The dust-proof sensing device 100 is adapted for being used in a printer or a scanner. A middle of the dust-proof sensing device 100 has a feeding path 10. The dust-proof sensing device 100 includes a first photoelectric sensor 20 disposed above a top side of the feeding path 10, and a second photoelectric sensor 30 disposed under a bottom side of the feeding path 10. The first photoelectric sensor 20 is arranged towards the top side of the feeding path 10. The second photoelectric sensor 30 is arranged towards the bottom side of the feeding path 10. The first photoelectric sensor 20 and the second photoelectric sensor 30 are isolated by the feeding path 10.

In this preferred embodiment, the first photoelectric sensor 20 is an emitter photo-electricity crystal sensor. The second photoelectric sensor 30 is a collector photo-electricity crystal sensor. In order to describe the dust-proof sensing device 100 more conveniently, an upper side of the dust-proof sensing device 100 is defined as the top side of the feeding path 10, or the upper side of the dust-proof sensing device 100 is located above the top side of the feeding path 10. A lower side of the dust-proof sensing device 100 is defined as the bottom side of the feeding path 10, or the lower side of the dust-proof sensing device 100 is located below the bottom side of the feeding path 10. The upper side of the dust-proof sensing device 100 and the lower side of the dust-proof sensing device 100 are isolated by the feeding path 10.

Referring to FIG. 1, FIG. 2, FIG. 3 and FIG. 5, the dust-proof sensing device 100 further includes a mechanical body 103, a first printed circuit board 40a, a second printed circuit board 40b, an upper bracket 21 mounted above the top side of the feeding path 10, and a lower bracket 31 mounted under the bottom side of the feeding path 10. The upper bracket 21 and the lower bracket 31 are isolated by the feeding path 10. A middle of the mechanical body 103 of the dust-proof sensing device 100 has the feeding path 10.

The upper bracket 21 has an upper fastening portion 21a fastened to the mechanical body 103, an upper wedging portion 21b fastened at a lower portion of the upper fastening portion 21a, an L-shaped upper light guiding holder 22 fastened at one side of a lower surface of the upper fastening portion 21a, and a first light guider 22a fastened at an outer surface of a short section 221 of the L-shaped upper light guiding holder 22. The first photoelectric sensor 20 is corresponding to the first light guider 22a.

The upper fastening portion 21a has a first mounting section 211 and a first inclined section 212. The first mounting section 211 is disposed horizontally. A top surface and a bottom surface of the first mounting section 211 of the upper fastening section 21a are parallel to a horizontal plane. The first mounting section 211 of the upper fastening section 21a is parallel to the feeding path 10. The first inclined section 212 is connected to an outer side of the first mounting section 211. The first photoelectric sensor 20 is fastened on an upper surface of the first inclined section 212. The upper wedging portion 21b is connected between the outer side of the first mounting section 211 and an outer side of the first inclined section 212. The first photoelectric sensor 20 is blocked by the upper light guiding holder 22, the first mounting section 211 of the upper fastening portion 21a and the upper wedging portion 21b. A bottom of the first photoelectric sensor 20 is exposed beyond a bottom surface of the upper wedging portion 21b. The first photoelectric sensor 20 is fastened below the upper wedging portion 21b. The first mounting section 211 of the upper fastening portion 21a is fastened to the mechanical body 103.

Figure 2:
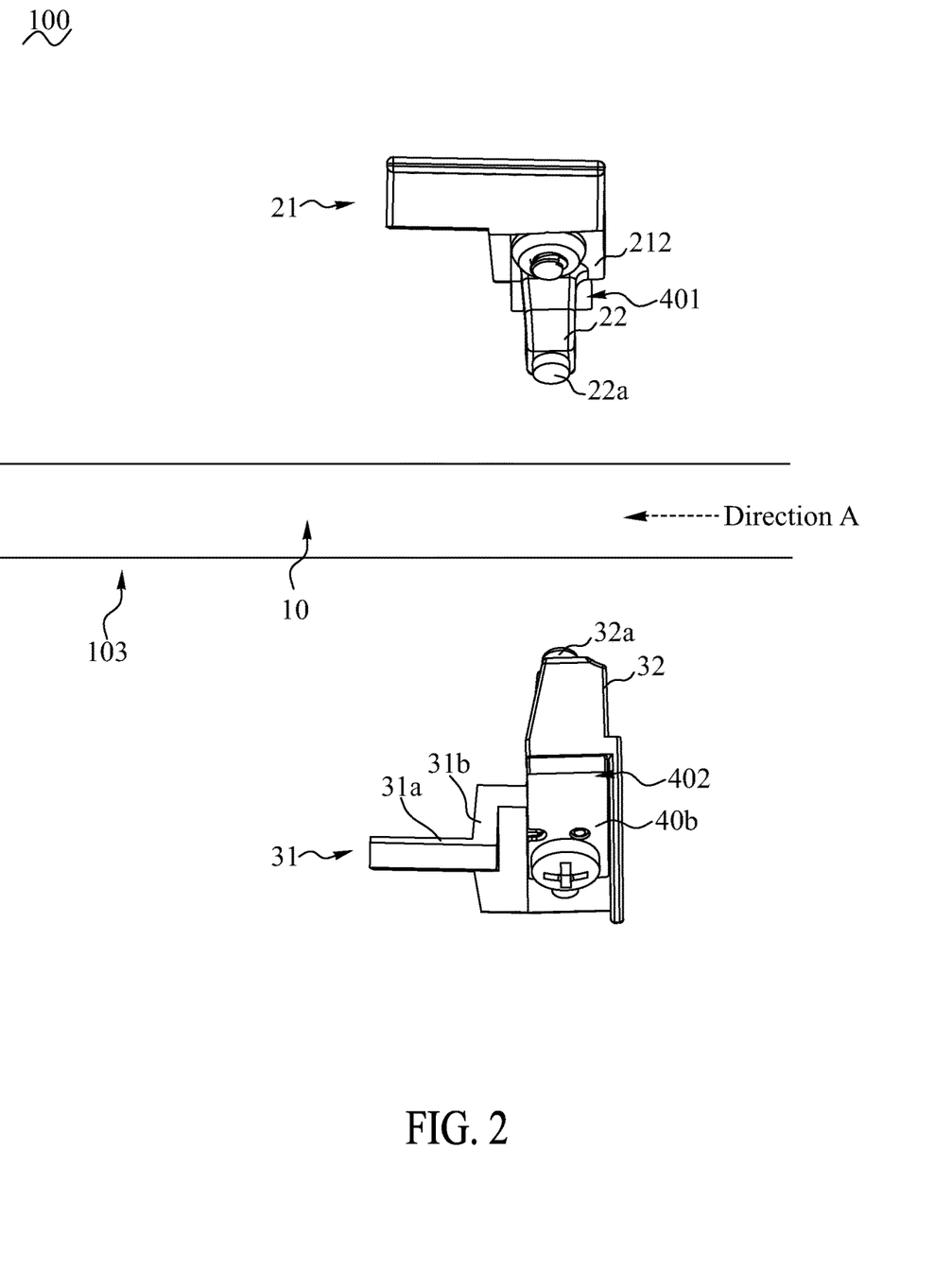
FIG. 2 is a side view of the dust-proof sensing device in accordance with the preferred embodiment of the present invention, wherein the dust-proof sensing device is used in the printer or the scanner.
Figure 3:
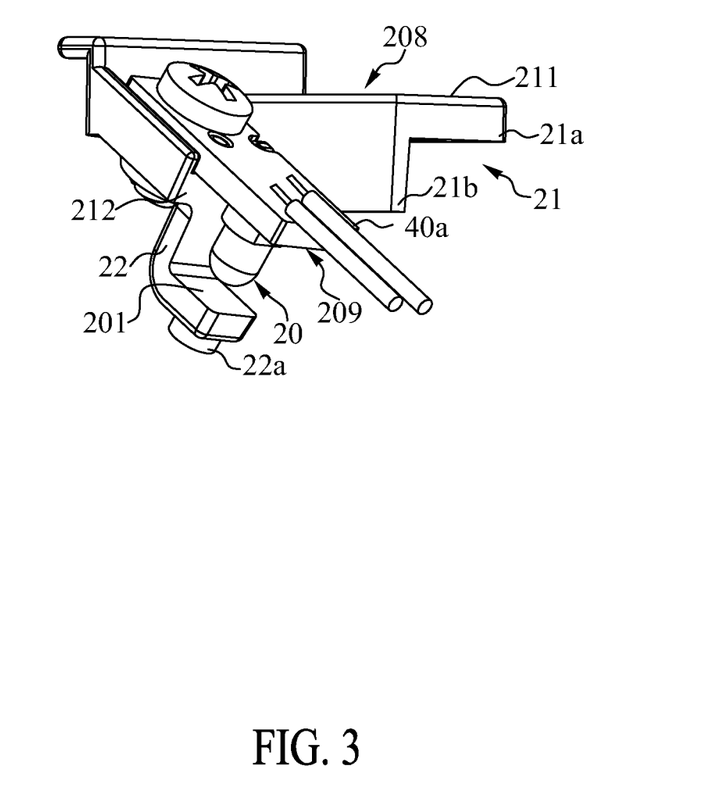
FIG. 3 is a perspective view of a first photoelectric sensor of the dust-proof sensing device in accordance with the preferred embodiment of the present invention, wherein the dust-proof sensing device is used in the printer or the scanner.
Figure 4:
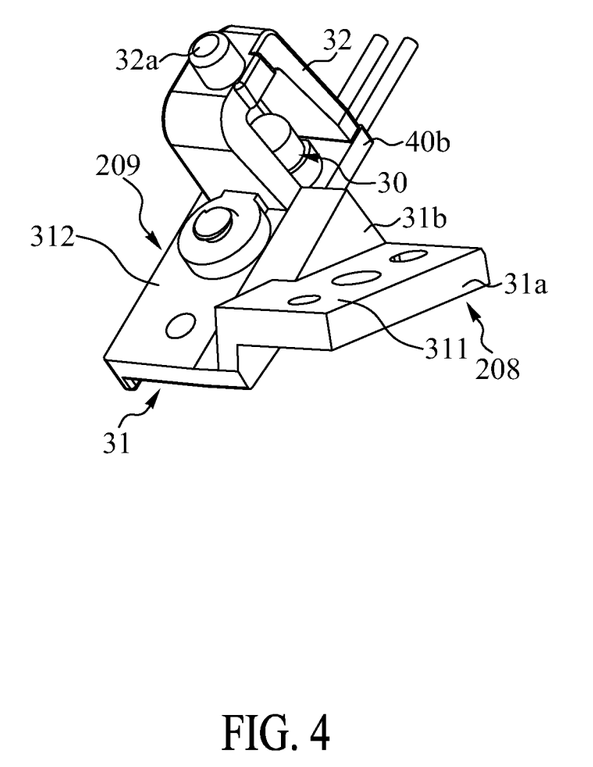
FIG. 4 is a perspective view of a second photoelectric sensor of the dust-proof sensing device in accordance with the preferred embodiment of the present invention, wherein the dust-proof sensing device is used in the printer or the scanner.
Figure 5:
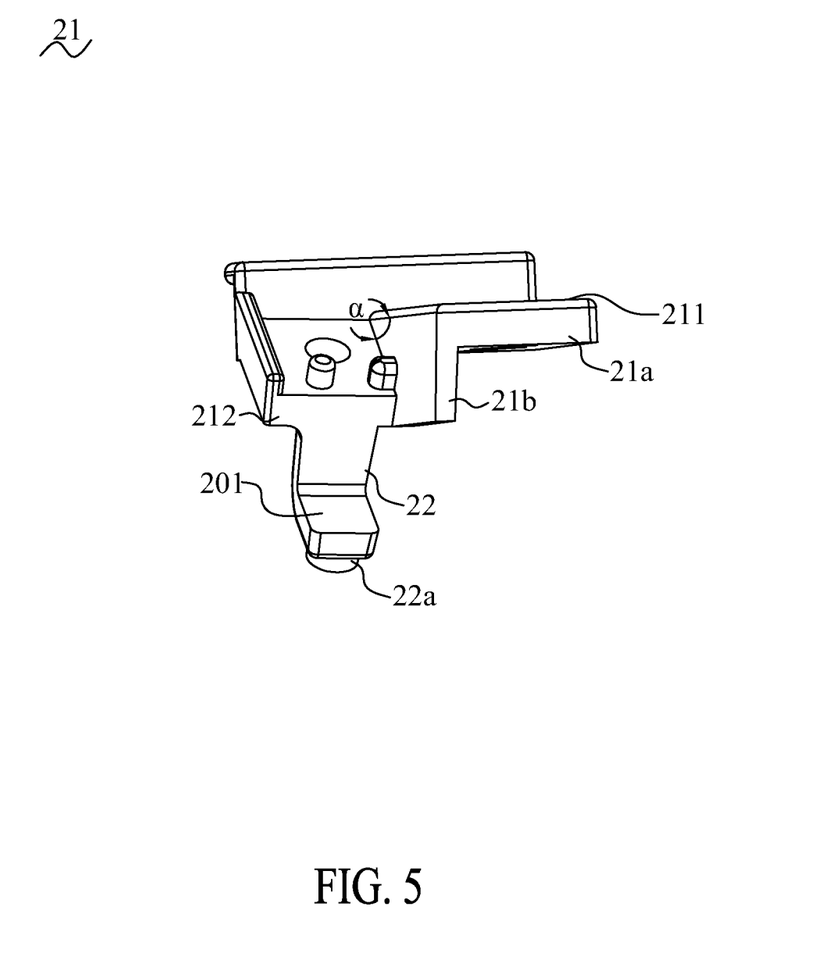
FIG. 5 is a perspective view of an upper bracket of the dust-proof sensing device in accordance with the preferred embodiment of the present invention, wherein the dust-proof sensing device is used in the printer or the scanner.
Figure 6:
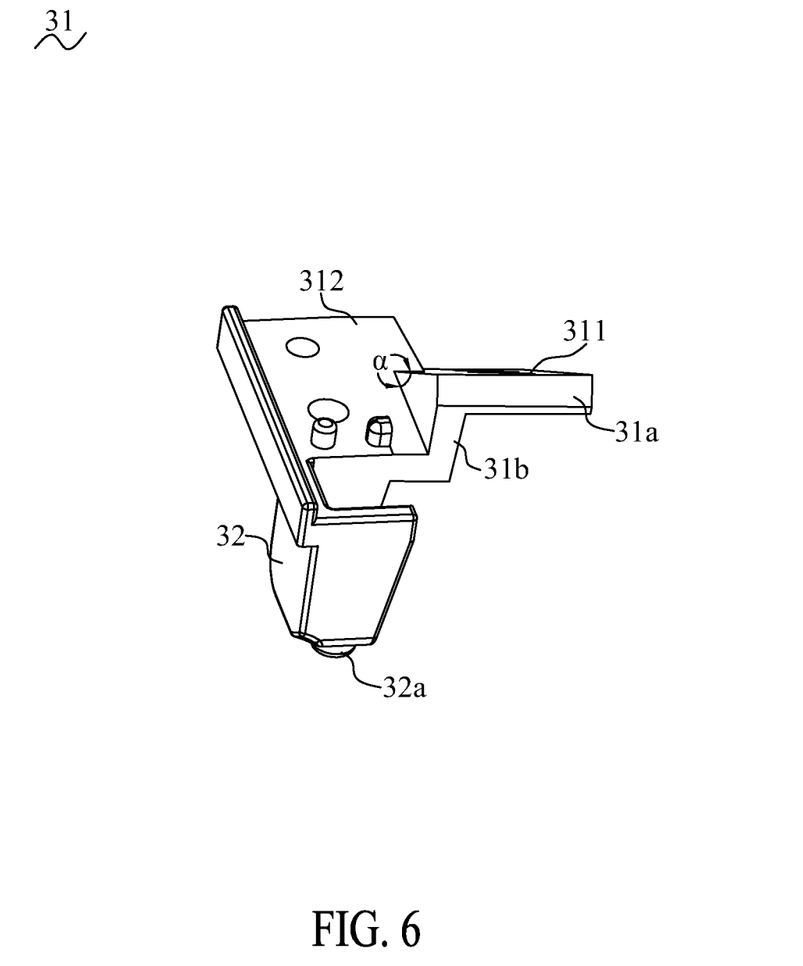
FIG. 6 is a perspective view of a lower bracket of the dust-proof sensing device in accordance with the preferred embodiment of the present invention, wherein the dust-proof sensing device is used in the printer or the scanner.

The L-shaped upper light guiding holder 22 has a mouth 201. The mouth 201 faces the first photoelectric sensor 20. The first photoelectric sensor 20 is mounted to the first printed circuit board 40a. The first printed circuit board 40a has a first photoelectric detection circuit 401. The first photoelectric sensor 20 is connected to the first photoelectric detection circuit 401, and the first photoelectric detection circuit 401 is arranged on the first printed circuit board 40a. The first printed circuit board 40a is mounted to the upper surface of the first inclined section 212. For describing the dust-proof sensing device 100 more clearly and conveniently, a front end in this description is defined as an entrance end of the feeding path 10 which is shown in FIG. 1 and FIG. 2. A rear end in this description is opposite to the front end in this description. The horizontal plane extends along a direction which is perpendicular to a gravity direction.

Referring to the FIG. 1, FIG. 2, FIG. 3 and FIG. 6, in order to ensure that a paper (not shown) in the feeding path 10 is completed being detected, the dust-proof sensing device 100 which is used in the printer or the scanner, includes the lower bracket 31. The lower bracket 31 has a lower fastening portion 31a fixed to the mechanical body 103, and a lower wedging portion 31b protruded upward from one side of an upper surface of the lower fastening portion 31a. The lower fastening portion 31a has a second mounting section 311 and a second inclined section 312. The second mounting section 311 is disposed horizontally. A top surface and a bottom surface of the second mounting section 311 are parallel to the horizontal plane. The second mounting section 311 is parallel to the feeding path 10. The second inclined section 312 is connected to an inner side of the second mounting section 311. The lower wedging portion 31b is connected between the second mounting section 311 and the second inclined section 312.

The second photoelectric sensor 30 is positioned at a front end of a lower surface of the second inclined section 312. The second photoelectric sensor 30 is connected to the front end of the lower surface of the second inclined section 312 of the lower fastening portion 31a along a direction which is perpendicular to the lower surface of the second inclined section 312 of the lower fastening portion 31a. The second photoelectric sensor 30 is mounted to the second printed circuit board 40b. The second printed circuit board 40b has a second photoelectric detection circuit 402. The second photoelectric sensor 30 is connected to the second photoelectric detection circuit 402. The second photoelectric detection circuit is placed on the second printed circuit board 40b. The second printed circuit board 40b is mounted to the lower surface of the second inclined section 312.

The lower bracket 31 is mounted adjacent to the entrance end of the feeding path 10. The lower bracket 31 further includes a hooded lower light guiding holder 32. An inner side of a front end of the lower fastening portion 31a slantwise extends frontward and upward to form the hooded lower light guiding holder 32. A front end of the second inclined section 312 of the lower fastening portion 31a slantwise extends frontward and upward to form the hooded lower light guiding holder 32. The hooded lower light guiding holder 32 extends beyond a front end of the lower wedging portion alb. The hooded lower light guiding holder 32 is perpendicular to the second inclined section 312 of the lower fastening portion 31a. The hooded lower light guiding holder 32 is a hollow shape. A lower portion and one side of the hooded lower light guiding bracket 32 adjacent to the lower wedging portion 31b are opened freely. A top of the hooded lower light guiding holder 32 is equipped with a second light guider 32a. The second photoelectric sensor 30 is disposed to a front end of the lower bracket 31. The second photoelectric sensor 30 is corresponding to the second light guider 32a. The second photoelectric sensor 30 is assembled in the hooded lower light guiding holder 32. The second printed circuit board 40b is located below the hooded lower light guiding holder 32. The second photoelectric sensor 30 is in alignment with the first photoelectric sensor 20 through the first light guider 22a and the second light guider 32a. The first photoelectric sensor 20 is located above the feeding path 10, and the second photoelectric sensor 30 is located below the feeding path 10, so that the paper is completed being detected in place.

Referring to FIG. 1 to FIG. 6, an inner edge of the top surface of the first mounting section 211 is intersected with an inner edge of the upper surface of the first inclined section 212 to form a clamping angle α. The inner edge of the upper surface of the first inclined section 212 of the upper fastening portion 21a is intersected with a top edge of an inner surface of the upper wedging portion 21b to form the clamping angle α. The first photoelectric sensor 20 and the horizontal plane also form the clamping angle α. A rear of a lower edge of an inner surface of the lower wedging portion 31b away from the hooded lower light guiding holder 32 is intersected with the bottom surface of the second mounting section 311 of the lower fastening portion 31a to form the clamping angle α. The horizontal plane, and a center line of the first photoelectric sensor 20 and the second photoelectric sensor 30 also form the clamping angle α.

In the preferred embodiment, a top of the feeding path 10 has an upper opening 101, and a bottom of the feeding path 10 has a lower opening 102. The upper opening 101 and the lower opening 102 are communicated through the feeding path 10. The upper opening 101 is corresponding to the lower opening 102 along an inclined direction. The dust-proof sensing device 100 feeds the paper along a feeding direction (A). The inclined direction and the feeding direction (A) form the clamping angle α. The first photoelectric sensor 20 is corresponding to the upper opening 101. The second photoelectric sensor 30 is corresponding to the lower opening 102. The clamping angle α is preferably chosen as thirty-five degrees, so when the paper is fed in the feeding direction (A), paper scraps and carbon dust will be deposited behind the second photoelectric sensor 30 and be fell on the lower fastening portion 31a, and photoelectric sensing signals of the second photoelectric sensor 30 will be without being shielded.

Referring to FIG. 1 to FIG. 6, the dust-proof sensing device 100 of the printer or the scanner, includes the mechanical body 103, the feeding path 10 formed in the mechanical body 103, a photoelectric sensor 203 and a bracket 202. The photoelectric sensor 203 is disposed above the top side of the feeding path 10 or disposed under the bottom side of the feeding path 10. The bracket 202 is mounted above the top side of the feeding path 10 or mounted below the bottom side of the feeding path 10. The bracket 202 has a fastening portion 204 fastened to the mechanical body 103, a wedging portion 205, a light guiding holder 206 and a light guider 207. The fastening portion 204 has a mounting section 208, and an inclined section 209 connected to an outer side or an inner side of the mounting section 208. The mounting section 208 is disposed horizontally. A top surface and a bottom surface of the mounting section 208 are parallel to the horizontal plane. The photoelectric sensor 203 is connected to the inclined section 209. The wedging portion 205 is connected between the mounting section 208 and the inclined section 209. The wedging portion 205 is fastened at a lower portion or an upper portion of the fastening portion 204. An inner edge of an upper surface of the inclined section 209 of the fastening portion 204 is intersected with a top edge of an inner surface of the wedging portion 205 to form the clamping angle α, or a rear of a lower edge of an inner surface of the wedging portion 205 is intersected with the bottom surface of the mounting section 208 of the fastening portion 204 to form the clamping angle α. The light guiding holder 206 is mounted at the inclined section 209, and the light guiding holder 206 is positioned below or above the photoelectric sensor 203. The light guider 207 is positioned at a bottom or a top of the light guiding holder 206. The photoelectric sensor 203 is corresponding to the light guider 207. The horizontal plane and a center line of the photoelectric sensor 203 form the clamping angle α. The mounting section 208 is parallel to the feeding path 10.

The photoelectric sensor 203 is the first photoelectric sensor 20 or the second photoelectric sensor 30. The bracket 202 is the upper bracket 21 or the lower bracket 31. The fastening portion 204 is the upper fastening portion 21a or the lower fastening portion 31a. The wedging portion 205 is the upper wedging portion 21b or the lower wedging portion 31b. The light guiding holder 206 is the upper light guiding holder 22 or the lower light guiding holder 32. The light guider 207 is the first light guider 22a or the second light guider 32a. The mounting section 208 is the first mounting section 211 or the second mounting section 311. The inclined section 209 is the first inclined section 212 or the second inclined section 312.

As described above, the inner edge of the upper surface of the first inclined section 212 of the upper fastening portion 21a is intersected with the top edge of the inner surface of the upper wedging portion 21b to form the clamping angle α, and the lower edge of the inner surface of the lower wedging portion 31b away from the hooded lower light guiding holder 32 is intersected with the bottom surface of the second mounting section 311 of the lower fastening portion 31a to form the clamping angle α, so the paper scraps and the carbon dust will be deposited behind the second photoelectric sensor 30, and the photoelectric sensing signals of the second photoelectric sensor 30 will be without being shielded.

What is claimed is:

1. A dust-proof sensing device adapted for being used in a printer or a scanner, comprising:
a mechanical body;
a feeding path, a middle of the mechanical body having a feeding path;
a first photoelectric sensor disposed above a top side of the feeding path;
a second photoelectric sensor disposed under a bottom side of the feeding path; and
an upper bracket mounted above the top side of the feeding path, the upper bracket having an upper fastening portion fastened to the mechanical body, an upper wedging portion fastened at a lower portion of the upper fastening portion, an L-shaped upper light guiding holder fastened at one side of a lower surface of the upper fastening portion, and a first light guider fastened at an outer surface of a short section of the L-shaped upper light guiding holder, the upper fastening portion having a first mounting section, and a first inclined section connected to an outer side of the first mounting section, the first mounting section being disposed horizontally, a top surface and a bottom surface of the first mounting section of the upper fastening section being parallel to a horizontal plane, an inner edge of an upper surface of the first inclined section of the upper fastening portion being intersected with a top edge of an inner surface of the upper wedging portion to form a clamping angle,
wherein the horizontal plane, and a center line of the first photoelectric sensor and the second photoelectric sensor also form the clamping angle, the first photoelectric sensor is fastened below the upper wedging portion, the first photoelectric sensor and the horizontal plane also form the clamping angle.

2. The dust-proof sensing device as claimed in claim 1, further comprising a lower bracket mounted under the bottom side of the feeding path, the lower bracket being mounted adjacent to an entrance end of the feeding path, the second photoelectric sensor being disposed to a front end of the lower bracket, the upper bracket and the lower bracket being isolated by the feeding path, the lower bracket having a lower fastening portion fixed to the mechanical body, and a lower wedging portion protruded upward from one side of an upper surface of the lower fastening portion, the lower fastening portion having a second mounting section, and a second inclined section connected to an inner side of the second mounting section, the second mounting section being disposed horizontally, a top surface and a bottom surface of the second mounting section being parallel to the horizontal plane.

3. The dust-proof sensing device as claimed in claim 2, wherein the lower wedging portion is connected between the second mounting section and the second inclined section.

4. The dust-proof sensing device as claimed in claim 2, wherein an inner side of a front end of the lower fastening portion slantwise extends frontward and upward to form a hooded lower light guiding holder, the hooded lower light guiding holder extends beyond a front end of the lower wedging portion, the hooded lower light guiding holder is a hollow shape, a lower portion and one side of the hooded lower light guiding holder adjacent to the lower wedging portion are opened freely, a top of the hooded lower light guiding holder is equipped with a second light guider, the second photoelectric sensor is assembled in the hooded lower light guiding holder.

5. The dust-proof sensing device as claimed in claim 4, wherein a lower edge of an inner surface of the lower wedging portion away from the hooded lower light guiding holder is intersected with the bottom surface of the second mounting section of the lower fastening portion to form the clamping angle.

6. The dust-proof sensing device as claimed in claim 4, wherein the first photoelectric sensor is blocked by the upper light guiding holder, the first mounting section of the upper fastening portion and the upper wedging portion, the second photoelectric sensor is connected to a front end of a lower surface of the second inclined section of the lower fastening portion along a direction which is perpendicular to the lower surface of the second inclined section of the lower fastening portion, the second photoelectric sensor is in alignment with the first photoelectric sensor through the first light guider and the second light guider.

7. The dust-proof sensing device as claimed in claim 6, further comprising a first printed circuit board and a second printed circuit board, the first printed circuit board being mounted to the upper surface of the first inclined section, the second printed circuit board being mounted to the lower surface of the second inclined section, the first photoelectric sensor being mounted to the first printed circuit board, the first printed circuit board having a first photoelectric detection circuit, the first photoelectric sensor being connected to the first photoelectric detection circuit, the second photoelectric sensor being mounted to the second printed circuit board, the second printed circuit board having a second photoelectric detection circuit, the second photoelectric sensor being connected to the second photoelectric detection circuit.

8. The dust-proof sensing device as claimed in claim 1, wherein the clamping angle is chosen as thirty-five degrees.

9. A dust-proof sensing device adapted for being used in a printer or a scanner, comprising:
a mechanical body;
a feeding path, a middle of the mechanical body having a feeding path;
a first photoelectric sensor disposed above a top side of the feeding path;
a second photoelectric sensor disposed under a bottom side of the feeding path;
an upper bracket mounted above the top side of the feeding path, the upper bracket having an upper fastening portion fastened to the mechanical body, an upper wedging portion fastened at a lower portion of the upper fastening portion, an L-shaped upper light guiding holder fastened at one side of a lower surface of the upper fastening portion, and a first light guider fastened at an outer surface of a short section of the L-shaped upper light guiding holder, the first photoelectric sensor being corresponding to the first light guider, the upper fastening portion having a first mounting section, and a first inclined section connected to an outer side of the first mounting section, the first mounting section being disposed horizontally, a top surface and a bottom surface of the first mounting section of the upper fastening section being parallel to a horizontal plane, an inner edge of an upper surface of the first inclined section of the upper fastening portion being intersected with a top edge of an inner surface of the upper wedging portion to form a clamping angle; and
a lower bracket mounted under the bottom side of the feeding path, the upper bracket and the lower bracket being isolated by the feeding path, the lower bracket having a lower fastening portion fixed to the mechanical body, and a lower wedging portion protruded upward from one side of an upper surface of the lower fastening portion, an inner side of a front end of the lower fastening portion slantwise extending frontward and upward to form a hooded lower light guiding holder, the hooded lower light guiding holder extending beyond a front end of the lower wedging portion, a top of the hooded lower light guiding holder being equipped with a second light guider, the second photoelectric sensor being assembled in the hooded lower light guiding holder, the second photoelectric sensor being corresponding to the second light guider,
wherein the horizontal plane, and a center line of the first photoelectric sensor and the second photoelectric sensor also form the clamping angle, the first photoelectric sensor is fastened below the upper wedging portion, the first photoelectric sensor and the horizontal plane also form the clamping angle, the second photoelectric sensor is in alignment with the first photoelectric sensor through the first light guider and the second light guider.

10. A dust-proof sensing device of a scanner or a printer, comprising:
a mechanical body;
a feeding path formed in the mechanical body;

a photoelectric sensor disposed above a top side of the feeding path or disposed under a bottom side of the feeding path; and a bracket mounted above the top side of the feeding path or mounted below the bottom side of the feeding path, the bracket having a fastening portion fastened to the mechanical body, the fastening portion having a mounting section, and an inclined section connected to an outer side or an inner side of the mounting section, the mounting section being disposed horizontally, a top surface and a bottom surface of the mounting section being parallel to a horizontal plane, the photoelectric sensor being connected to the inclined section, a wedging portion connected between the mounting section and the inclined section, the wedging portion being fastened at a lower portion or an upper portion of the fastening portion, an inner edge of an upper surface of the inclined section of the fastening portion being intersected with a top edge of an inner surface of the wedging portion to form a clamping angle, or a rear of a lower edge of an inner surface of the wedging portion being intersected with the bottom surface of the mounting section of the fastening portion to form the clamping angle, a light guiding holder mounted at the inclined section, and the light guiding holder being positioned below or above the photoelectric sensor, and a light guider positioned at a bottom or a top of the light guiding holder, the photoelectric sensor being corresponding to the light guider, wherein the horizontal plane and a center line of the photoelectric sensor form the clamping angle.

11. The dust-proof sensing device as claimed in claim 10, wherein the mounting section is parallel to the feeding path.

* * * * *